US008988987B2

(12) United States Patent
Bakhshi et al.

(10) Patent No.: US 8,988,987 B2
(45) Date of Patent: Mar. 24, 2015

(54) TECHNOLOGY FOR NETWORK COMMUNICATION BY A COMPUTER SYSTEM USING AT LEAST TWO COMMUNICATION PROTOCOLS

(71) Applicant: International Business Machines Corporation, Armonk, NY (US)

(72) Inventors: Mel Mehrdad Bakhshi, Markham (CA); Philip Kunsik Cho, Scarborough (CA); Vinit Jain, Austin, TX (US); Mladen Kovacevic, Toronto (CA); Pandu Ranga Rao Mutyala, Markham (CA); David Ross Willoughby, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 208 days.

(21) Appl. No.: 13/660,973

(22) Filed: Oct. 25, 2012

(65) Prior Publication Data
US 2014/0119174 A1 May 1, 2014

(51) Int. Cl.
H04L 12/26 (2006.01)
H04L 12/46 (2006.01)

(52) U.S. Cl.
CPC ....................... H04L 12/46 (2013.01)
USPC .......................................... 370/221

(58) Field of Classification Search
USPC ............................ 370/254, 395.53
See application file for complete search history.

(56) References Cited

U.S. PATENT DOCUMENTS

| 6,766,482 | B1 | 7/2004 | Yip | |
|---|---|---|---|---|
| 7,428,237 | B1 | 9/2008 | Gai | |
| 2006/0005185 | A1* | 1/2006 | Nguyen | 718/1 |
| 2006/0123204 | A1 | 6/2006 | Brown | |
| 2006/0195618 | A1* | 8/2006 | Arndt et al. | 710/1 |
| 2007/0266127 | A1 | 11/2007 | Richter | |
| 2008/0244620 | A1 | 10/2008 | Cagno | |
| 2012/0113871 | A1 | 5/2012 | Bulusu | |
| 2012/0177041 | A1 | 7/2012 | Berman | |
| 2012/0180047 | A1 | 7/2012 | Cardona | |
| 2012/0213507 | A1 | 8/2012 | Decusatis | |

FOREIGN PATENT DOCUMENTS

| WO | 2006057923 A2 | 6/2006 |
|---|---|---|
| WO | 2011134295 A1 | 3/2011 |

OTHER PUBLICATIONS

PCTEP2013067726 ISR and Written Opinion Oct. 17, 2013.
Cisco NX-OS Virtual PortChannel:Fundamental Design Concepts wtih NXOS 5.0, Cisco Systems, Inc., San Jose, CA, 2010, pp. 38 pages.
Linux Ethernet Bonding Driver HowTo, Jun. 21, 2005, downloaded Sep. 1, 2012, http://www.cyberciti.biz/howto/question/static/linux-ethernet-bonding-driver-howto.php, 30 pages.

* cited by examiner

Primary Examiner — Gary Mui
(74) Attorney, Agent, or Firm — Anthony V. S. England; Ingrid Foerster

(57) ABSTRACT

A network adapter has a first and second virtual local area network ("VLAN") device configured on each of first and second physical ports of the network adapter. The second VLAN devices are configured as a logically bonded, virtual device.

11 Claims, 6 Drawing Sheets

TECHNOLOGY FOR NETWORK COMMUNICATION BY A COMPUTER SYSTEM USING AT LEAST TWO COMMUNICATION PROTOCOLS

BACKGROUND

In contemporary operating systems, data transfers to a computer system via TCP/IP typically require processing within the system's OS kernel's networking stack, which requires involvement of the system's CPU, of course. Consequently, higher speed transfers in modern high-speed Ethernet technology tend to increase load on the CPU, particularly for servers handling bulk traffic such as storage servers. For this and other reasons, the networking industry and its Internet Engineering Task Force defined alternative OSI transport layer features for remote direct memory addressing ("RDMA"), including InfiniBand and iWARP.

Traditionally, various types of communication fabrics such as TCP, RDMA, Fibre Channel and others, have each had their own dedicated devices and switches.

SUMMARY

A computer program product for network communication is provided, according to one form of an embodiment of the invention. In other forms, systems and computer implemented methods are provided.

In one implementation, a computer system includes a network adapter having a first and second virtual local area network ("VLAN") device configured on each of first and second physical ports of the network adapter, and having the second VLAN devices configured as a logically bonded, virtual device.

In another aspect, a first application stored on a computer readable storage media and programmed to perform network communication via a first network communication protocol over the first VLAN devices; and In another aspect, an application stored on a computer readable storage media and programmed to perform network communication via a second network communication protocol over the second VLAN devices and the logically bonded, virtual device, wherein at least one of the first VLAN devices provides network communication via the first network communication protocol and the logically bonded, virtual device concurrently provides network communication via the second network communication protocol.

In another aspect, the first network communication protocol includes a remote direct memory access ("RDMA") protocol and the second network communication protocol includes a transmission control protocol ("TCP") protocol.

In another aspect, performing the network communication by at least one of the first VLAN devices via the first network communication protocol and by the logically bonded, virtual device via the second network communication protocol comprise: performing RDMA protocol communication on both of the first and second physical ports concurrently by the first VLAN devices; and performing TCP protocol communication on the second physical port by the logically bonded, virtual device and the second physical port's one of the second VLAN devices.

In another aspect, the computer system comprises a first instruction module having instructions stored on a computer readable media for performing the first network communication protocol; and a second instruction module having instructions stored on a computer readable media for performing the second network communication protocol. The first or second application is programmed to perform communication via the second instruction module for the second network communication protocol and the second instruction module is programmed to provide an active-active mode for the bonded, virtual device.

In another aspect, performing the network communication via the second network communication protocol by the logically bonded, virtual device further comprises: performing the network communication via the second network communication protocol on both the first and second physical ports by the logically bonded, virtual device, wherein both the second VLAN devices communicate concurrently.

In another aspect, the second instruction module is programmed to provide an active-backup mode for the bonded, virtual device and performing the network communication via the second network communication protocol by the logically bonded, virtual device further comprises performing the network communication via the second network communication protocol on one of the first and second physical ports by the logically bonded, virtual device, wherein only one of the second VLAN devices communicates at a time and when the communicating one of the second VLAN devices or its associated physical port fails, the other one of the second VLAN devices takes over the communication.

In another aspect, the first VLAN devices are configured with respective first and second network addresses and the bonded, virtual device is configured with a third network address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of one or more illustrative embodiments when read in conjunction with the accompanying drawings, wherein:

DETAILED DESCRIPTION OF EMBODIMENTS OF THE PRESENT INVENTION

High performance clusters running on rack based servers typically have multiple available I/O expansion slots for multiple adapters. However, more powerful servers in smaller form factors, such as blade servers or the IBM PureFlex ITE's, tend to have a more limited number of I/O expansion slots. (PureFlex is a trademark of International Business Machines Corporation.) Sometimes, only two I/O expansion slots are available to support more than two protocols. For this reason and also due to the emergence of converged networks, sometimes multiple protocols are handled by a single set of I/O devices and switches.

The most common protocol today is Ethernet, where TCP already runs natively. RDMA can run in RDMA over Converged Enhanced Ethernet (RoCEE) mode, and Fibre Channel can run with Fibre Channel over Ethernet. Each of these fabrics has their own properties and capabilities which may differ.

To run three different protocols via two I/O adapters, a choice must be made about which protocols will be combined. For instance, if Fibre Channel is chosen for the first adapter and Ethernet for the second, then it would be possible to run RDMA over Ethernet via the second adapter. However, while this consolidation of RDMA and TCP traffic on the same adapter is useful, it also has limitations.

Figure 4:
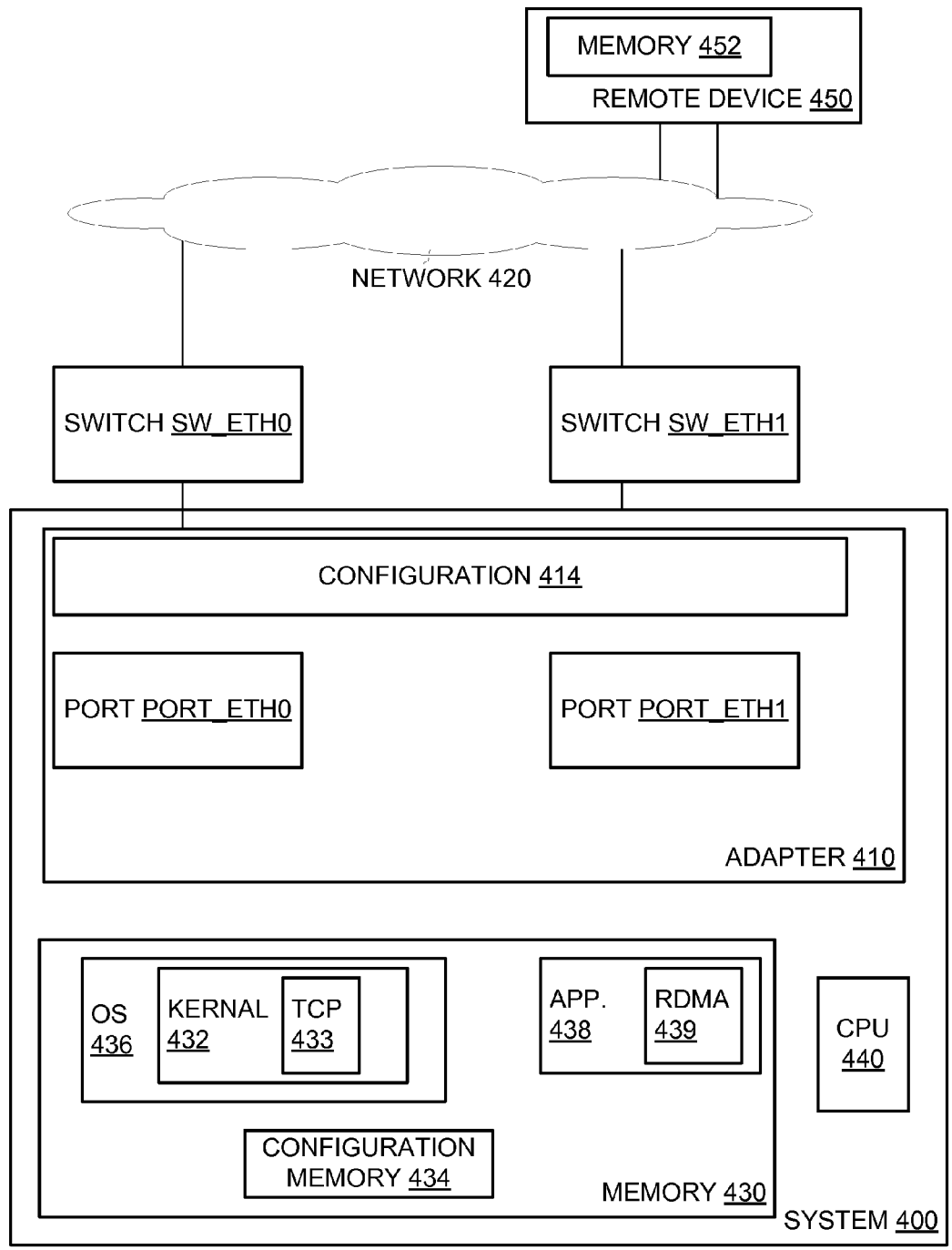
FIG. 4 is an exemplary block diagram that provides an overview of processes, structures and computer program products, according to one or more embodiments of the present invention.

A single network I/O adapter 410 of a computer system 400 is shown from a high level viewpoint in FIG. 4, according to one or more embodiments of the present invention. Adapter 410 has a configuration 414 for two Ethernet ports, port_eth0 and port_eth1 connected to switches, sw_eth0 and sw_eth1. That is, switches sw_eth0 and sw_eth1 connect network 420 to their ports port_eth0 and port_eth1 via configuration 414, with ports port_eth0 and port_eth1 providing paths to one or more central processing units, such as CPU 440, via a bus (not shown). The common fabric is Ethernet, with TCP and RDMA traffic converged on the single adapter 410. Port eth0 provides an initial, ordinary mode of operating for segregated TCP communication to and from remote devices, such as remote device 450, via network 420, whereas port port_eth1 provides an initial, ordinary mode of operating for segregated RDMA communication, i.e., RDMA over Converged Enhanced Ethernet (RoCEE). (In alternative embodiments, TCP traffic always runs on both ports eth0 and eth1. However, this may provide lopsided performance, since eth0 can run full speed with TCP, but eth1 has both TCP and RDMA traffic.)

In embodiments of the present invention, configuration 414 includes one or more processors, memory and instructions for causing processor or processors to direct traffic as described herein via interconnecting circuitry for communication, typically including one or more buses. In embodiments, configuration 414 may include one or more application specific integrated circuits for performing some or all of these functions.

System 400 includes a CPU 440 and memory 430 loaded with operating system 436 instructions, which includes a kernel 432 of instructions. Kernel 432 includes a TCP module 433 and a bonding module 435 of instructions configured and operable to cause CPU 440 to perform standard TCP and bonding functions respectively. Memory 430 is also loaded with instructions of application 438, such as a database or other application. For example, application 438 may be a distributed, enterprise database application suited for cluster operation, for example dB2, which is a trademark of International Business Machines Corporation.

In embodiments, application 438 uses both RDMA and TCP styles of communication simultaneously and includes an RDMA module 439 having instructions configured and operable to cause CPU 440 to perform standard RDMA functions. In other embodiments, separate instances of a single application 438, or else separate applications of different types, may each use a single network communication protocol. In any event, the system is configured for simultaneous communication using two different network communication protocols, i.e., RDMA and TCP in the illustrative instance.

Memory 430 includes non-volatile memory 434 associated with network communication modules, including RDMA module 439 and TCP module 433, for storing communications configuration parameters relating to network adapter 410. Module 439 is shown as a set of instructions included in application 438, whereas modules 433 and 435 are shown as sets of instructions included in kernel 432 instructions of operating system 436 instructions. However, it should be understood that in different embodiments the instructions may be associated with one another differently but still provide essentially the same functionality. Likewise, the location of configuration 414 and 434 memories may vary in alternative embodiments.

The initializing, configuring or programming described herein for communication protocol, VLAN and bonding devices and IP address configurations, etc. includes storing configuration parameters in network adapter configuration 414 non-volatile memory associated with the ports/switches and in memory 434 associated with network communication modules and applications. The initializing may be performed by a network administrator (locally or remotely) initiating communication with ports eth0 and eth1, which may be done manually via an OS 436 user interface or via a network management application, for example, wherein ports eth0 and eth1 receive signals from the remote application via network 420 to establish configuration data in configuration 414 memory for the ports and memory 434 for modules 433 and 439.

Figure 5:
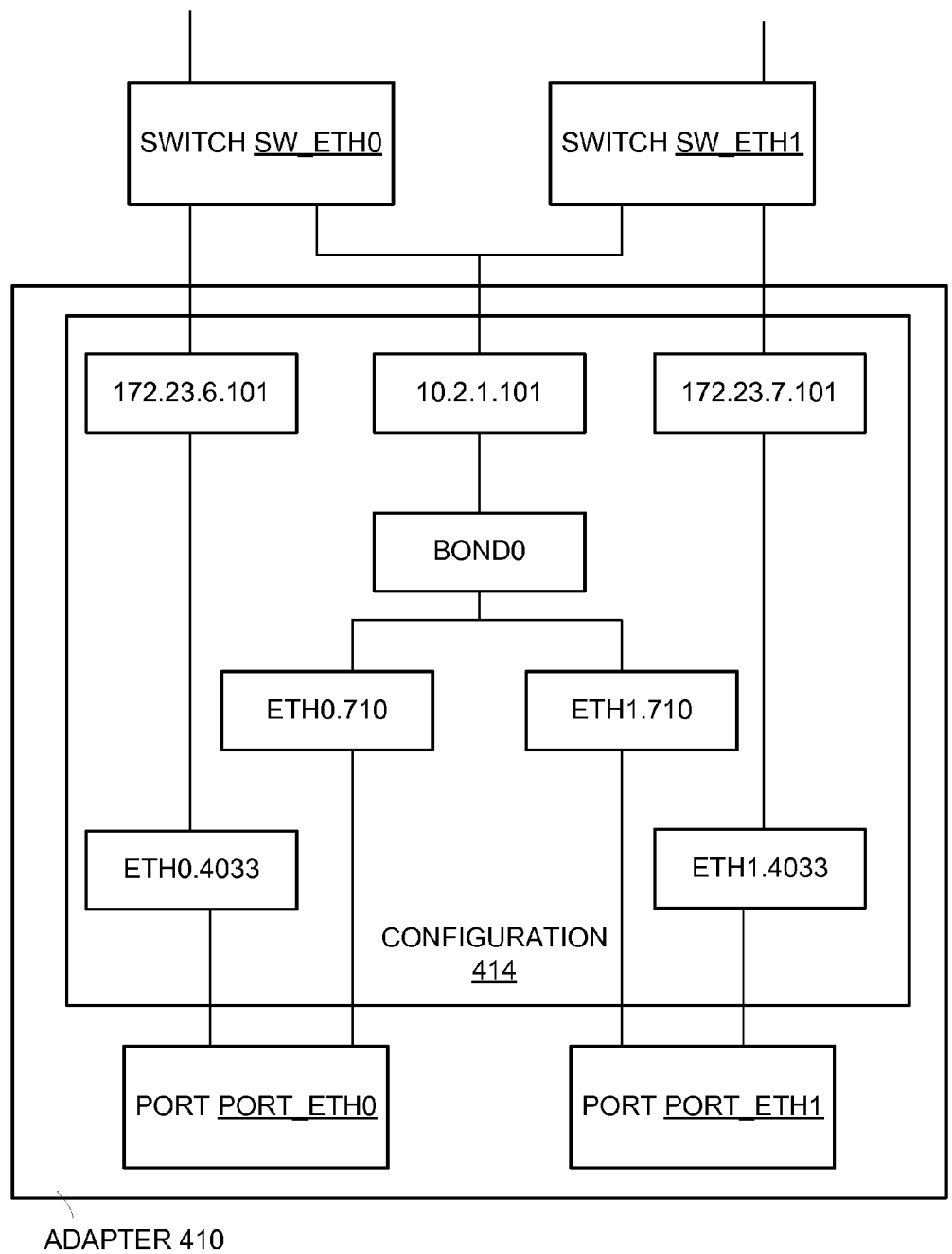
FIG. 5 is another exemplary block diagram that provides a more detailed view of configuration aspects, according to one or more embodiments of the present invention

In an ideal environment, all protocols travelling on the same fabric would have similar and shared characteristics. However, TCP is a lossy protocol and supports ether-channel bonding, while RDMA requires lossless communication and does not support bonding. To work around this, according to embodiments of the present invention, as shown in FIG. 5, ports eth0 and eth1 are initialized to include virtual devices, wherein eth0 is configured to create virtual local area network devices VLAN 710 (shown as eth0.710) and 4033 (shown as eth0.4033) and, likewise, eth1 is also configured to create virtual local area network devices VLAN 710 (shown as eth1.710) and 4033 (shown as eth1.4033).

In the illustrated instance, an IP address 172.23.7.101 is subsequently initialized onto VLAN device eth1.4033 for RDMA traffic, so that a remote device 450 may send and receive RDMA traffic via port port_eth1 using the 172.23.7.101 IP address and eth1.4033 VLAN tag device. (Alternatively, in the illustrated instance remote device 450 may tag packets with VLAN id 4033, send them on network 420, and computer system 400 will receive those packets on eth1.4033 VLAN device.) For TCP, a bond is initialized spanning both ports port_eth0 and port_eth1 on the two defined VLAN 710's, i.e., bond0->[eth0.710, eth1.710], as shown. In the illustrated instance, an IP address 10.21.1.101 is initialized onto bond0 for TCP traffic, so that a remote device 450 may send and receive TCP traffic via port port_eth0 or port_eth1 using the 10.21.1.101 IP address and the eth0.710 VLAN tag or the eth1.710 VLAN tag.

It should be appreciated that the above described arrangement, in which VLAN devices eth0.710 and eth1.710 are created on respective ports port_eth0 and port_eth1 and then the VLAN devices eth0.710 and eth1.710 are bonded (bond0), is different than bonding ports and then creating a VLAN device on the bond device. If two ports are directly bonded, which provides advantages for TCP load balancing and failover; neither port can be used for RDMA protocol communication according to currently known RDMA technology. Thus direct bonding tends to lead to requiring additional network adapters to accommodate RDMA communication. By creating VLAN devices eth0.710 and eth1.710 on ports port_eth0 and port_eth1 and bonding the VLAN devices instead of the ports, as in the illustrated embodiment of FIG. 5, this permits use of ports port_eth0 and port_eth1 for RDMA protocol communication and also permits use of each respective port's bonded VLAN devices eth0.710 and eth1.710 for TCP communication.

That is, according to one or more embodiments of the present invention, RDMA instruction module 439 does not provide instructions for communicating via the RDMA network communication protocol on a physical port logically bonded for TCP communication. Consequently, for such embodiments network adapter 410 cannot communicate via the RDMA network communication protocol on physical ports that are logically bonded in direct fashion. However, since network adapter's VLAN devices eth0.710 and eth1.710 are logical bonded as a virtual device bond0, this permits concurrent communications via the RDMA and TCP network communication protocols.

To further elaborate, although physical ports port_eth0 and port_eth1 themselves are accessible via a path that includes bond0, the ports may still have RDMA traffic, since the ports are isolated from the bond by VLAN devices eth0.710 and eth1.710, interposed between the ports and the bond. Operating system 436 sees VLAN virtual devices as separate. In embodiments, RDMA traffic in FIG. 5 is going over a separate virtual device (VLAN device eth1.4033) that is NOT part of the TCP bond that has been defined on VLAN device eth0.710 and VLAN device eth1.710.

Each port port_eth0 and port_eth1 is connected to a separate physical switch sw_eth0 and eth1, as previously mentioned. A connecting host such as remote device 450 minimally needs to be configured to connect only to the one switch associated with the port to which it communicates via RDMA, e.g., port_eth1 and sw_eth1 in the illustrative instance described above and shown in FIG. 5. Accordingly, at least the RDMA IP address 172.23.7.101, which was initialized in adapter 410 for VLAN device eth1.4033, as previously described, is initialized in configuration memory 452 of connecting host remote device 450. However, it may be more ideal to advantageously operate in an RDMA failover feature or else in a two-RDMA-port communication mode for embodiments of the present invention, wherein connecting host remote device 450 is configured to connect to both port_eth0 and port_eth1 (via VLAN devices eth0.4033 and eth1.4033). In either case, IP address 172.23.6.101 is also initialized for RDMA directly onto VLAN device eth0.4033 and configuration memory 452 of connecting host remote device 450, so that RDMA traffic, having a VLAN tag of identifier 4033, may also travel on port_eth0. For the two-port communication mode, both RDMA VLANs eth0.4033 and eth1.4033 are configured as active by RDMA module 439. For the failover mode, module 439 configures VLAN device eth1.4033 as active and VLAN device eth0.4033 as a failover backup.

In summary, for uninterrupted failover remote hosts (like device 450 in FIG. 4, for example) transmitting either RDMA or TCP traffic to system 400 are configured to connect to both the physical switch sw_eth0 for port_eth0 and the physical switch sw_eth1 for port_eth1, such that in the case of sw_eth0 or port_eth0 failure, the hosts can continue to reach system 400 via the still operating sw_eth1 and port_eth1 and, likewise, in the case of sw_eth1 or port_eth1 failure, the hosts can continue to reach system 400 via the still operating sw_eth0 and port_eth0.

Further regarding failover, both TCP failover and RDMA failover are facilitated according to one or more embodiments of the present invention. Active-backup bonding may be provided for TCP communication as a way to keep both TCP and RDMA traffic running consistently fast, i.e., instead of active-active bonding, wherein both VLAN devices allow TCP traffic at the same time. As to TCP failover with active-backup bonding, upon TCP module 433 detecting failure of port_eth0 or sw_eth0, module 435 responsively switches the TCP bond0 traffic automatically over to port_eth1, so that traffic continues seamlessly, which is a supported feature of a standard bonding module. Likewise, responsive to detecting that port_eth0 and sw_eth0 are available again, module 433 automatically switches the TCP traffic back to port_eth0 again. As to RDMA failover, application 438 is also provided RDMA module 439, according to one or more embodiments of the present invention, wherein module 439 is configured with instructions operable to cause CPU 440 to perform automatic failover functions. (A conventional kernel cannot handle this type of failover automatically for RDMA.) Responsive to RDMA module 439 detecting failure of the eth1 port or switch, module 439 automatically switches RDMA traffic from port_eth1 to port_eth0. Similarly, when RDMA module 439 detects the eth1 link is re-established, module 439 automatically re-configures the RDMA connections and resumes RDMA operation on port_eth1.

It should be appreciated that performance may decrease for both TCP and RDMA if they both run on the same port concurrently. By using VLAN devices and configuring system 400 for segregated TCP and RDMA traffic to run on separate ports as described above for TCP active-backup mode, performance is generally enhanced in comparison to running both TCP and RDMA on the same port concurrently (i.e., active-active mode). This dedicated port arrangement of active-backup mode is achieved as described herein without the disadvantage of failure mode risk that ordinarily accompanies such segregation, since TCP is capable of running on either one of ports port_eth0 or port_eth1 via bonding of TCP assigned VLAN devices eth0.710 and eth1.710, according to embodiments of the present invention. Another advantage of this bonding arrangement is that if RDMA traffic tends to be lower in a particular circumstance, the arrangement permits configuring TCP to run in active-active mode on the bonded TCP assigned VLAN devices of the two respective ports, thereby achieving double the bandwidth and throughput, but without having a network adapter for each of the TCP and RDMA protocols.

Figure 6:
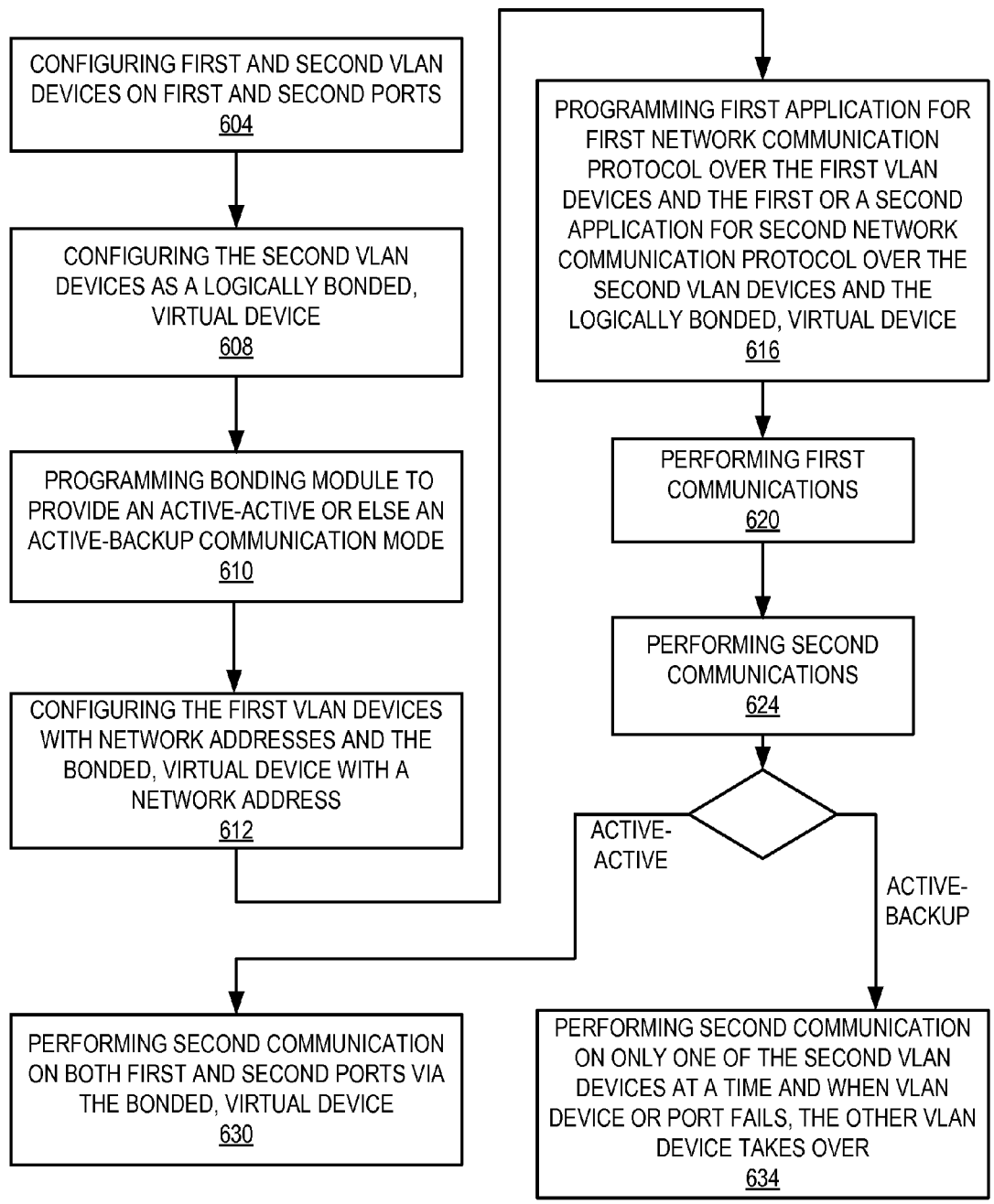
FIG. 6 is a flow chart illustrating exemplary process aspects, according to one or more embodiments of the present invention.

Referring now to FIG. 6, a flow chart is shown illustrating processes performed according to one or more embodiments of the present invention.

In one aspect, a process includes configuring 604 first and second virtual local area network ("VLAN") devices on respective first and second physical ports of a network adapter. This may be done by an administrator using an administrator interface of the computer system's operating system or of some other application. It may be done in an automated fashion by a configuration program using an application programming interface ("API"). The administrator accesses, either directly via the administrator interface or indirectly via the configuration program and API, accesses functions provided by instructions of the operating system or of a separate network communication application to create and store in nonvolatile memory for the system a data structure that has VLAN tags pointing at the ports (i.e., acting as addresses for the virtual LAN devices associated with the ports). This process of creating and storing the data structure in physical memory that is associated with the physical ports may be referred to as "initializing," "configuring," "programming" or the like.

In another aspect, the process includes configuring 608 the second VLAN devices as a logically bonded, virtual device. In another aspect, the bonding module is programmed 610 to provide an active-active or else an active-backup communication mode for the bonded, virtual device. This may be done in one of the fashions described immediately above via functions provided by instructions of a bonding instruction module, for example, wherein a data structure is created and stored in nonvolatile memory for the system that has a bond tag pointing at the two VLAN tags. The bonding functionality may be provided by an instruction module included as part of the operating system or may be a separately installed instruction module.

In another aspect, the process includes configuring 612 the first VLAN devices with respective first and second network addresses and configuring the bonded, virtual device with a third network address, resulting in a stored data structure associated with the VLAN devices and the bonded virtual device, which may be done in a fashion as described herein above.

In another aspect, the process includes programming 616 a first application on the computer system to perform network communication via a first network communication protocol over the first VLAN devices and programming the first or a second application on the computer system (which may include programming both first and second applications) to perform network communication via a second network communication protocol over the second VLAN devices and the logically bonded, virtual device. The first network communication protocol may be, for example, a remote direct memory access ("RDMA") protocol and the second network communication protocol, may be for example, a transmission control protocol ("TCP") protocol.

The one or more applications may include, for example, a database application, such as DB2 PureScale, Websphere, IBM Infosphere BigInsights, IBM Infosphere Streams, IBM Infosphere Data Warehouse, IBM PureData Systems (all of which are trademarks of International Business Machines Corporation) or may include applications by others. This programming may be done in one of the fashions described above via functions provided by instructions of the one or more applications, for example, wherein a data structure is created and stored in nonvolatile memory for the system that associates the application (i.e., points the application two) a communication protocol module that each application uses for communicating on the network and that also points each application to the IP address or addresses to use for the communication. Thus, the first application is programmed to perform first communication by executing a first instruction module for the first network communication protocol and the first application or a second application is programmed to perform second communication by executing a second instruction module for the second network communication protocol. Accordingly, at least one of the first VLAN devices provides network communication via the first network communication protocol and the logically bonded, virtual device concurrently provides network communication via the second network communication protocol.

In aspects, the process includes actually performing 620 the first communication to and from a network via the first network communications protocol, including performing the first communication via the first VLAN device on the first physical port of the computer system network adapter, and actually performing 624 the second communication to and from the network via the second network communications protocol. The second communication is performed on the second physical port via the logically bonded, virtual device and the second VLAN device of the second physical port and is concurrent with the first communication.

It should be appreciated that performing 620 first communications may include executing instructions of an instruction module for the first network communication protocol. According to one or more embodiments, the first network communication instruction module does not provide instructions for communicating on a logically bonded physical port via the first network communication protocol, so that the network adapter cannot communicate via the first network communication protocol on logically bonded physical ports. Nevertheless, an arrangement described herein, wherein the network adapter's VLAN devices are logical bonded as a virtual device, enables communication 620 and 624 concurrently via their respective first and second network communication protocols.

Depending on whether the system has been programmed to provide active-active or active-backup bonding, as described herein, the second communication is performed 630 on both the first and second physical ports via the logically bonded, virtual device, such that both the second VLAN devices communicate concurrently (active-active more) or else performed 634 on only one of the second VLAN devices communicates at a time (active-backup mode), such that when the communicating one of the second VLAN devices or its associated physical port fails, the other one of the second VLAN devices takes over the communication.

Figure 1:
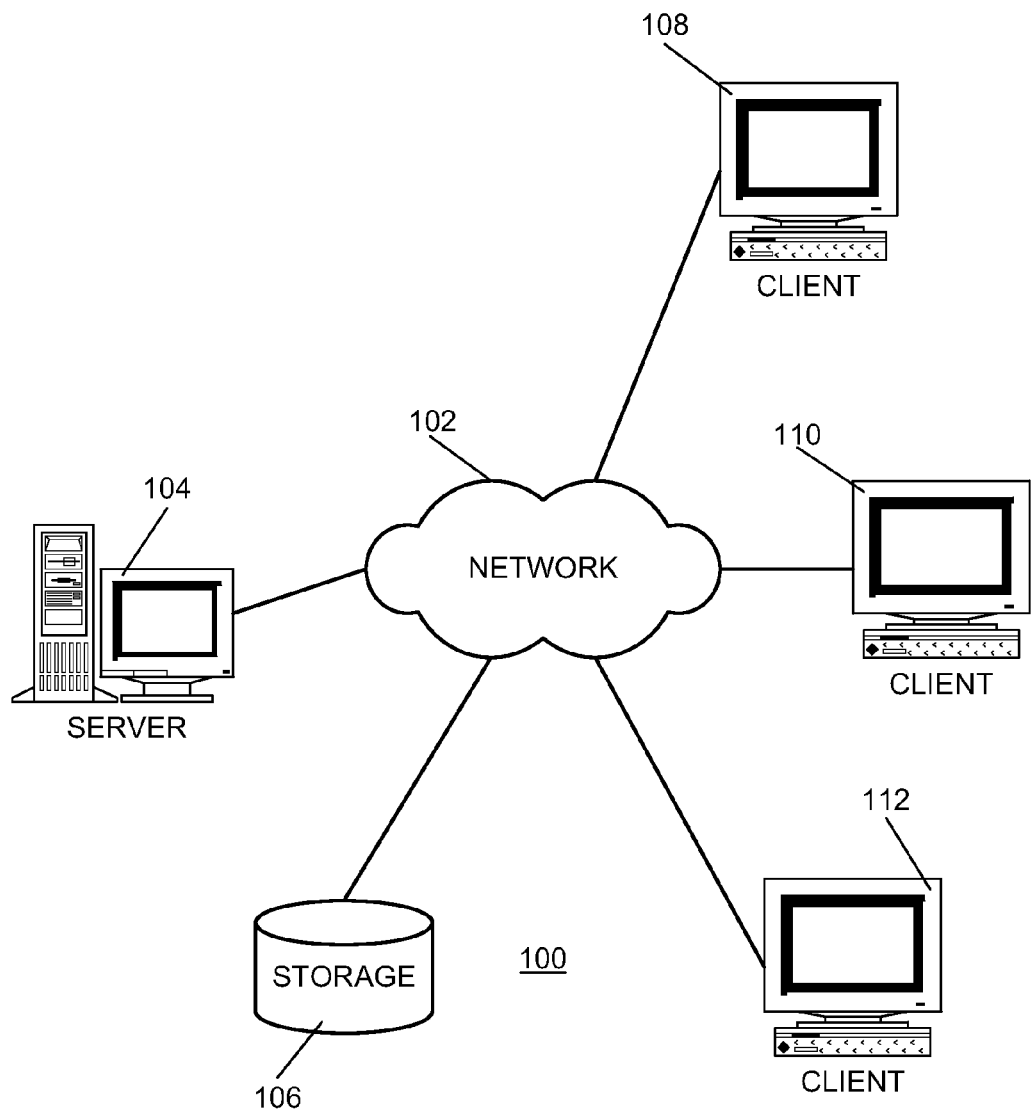
FIG. 1 is an exemplary block diagram illustrating a distributed data processing system according to one or more embodiments of the invention.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
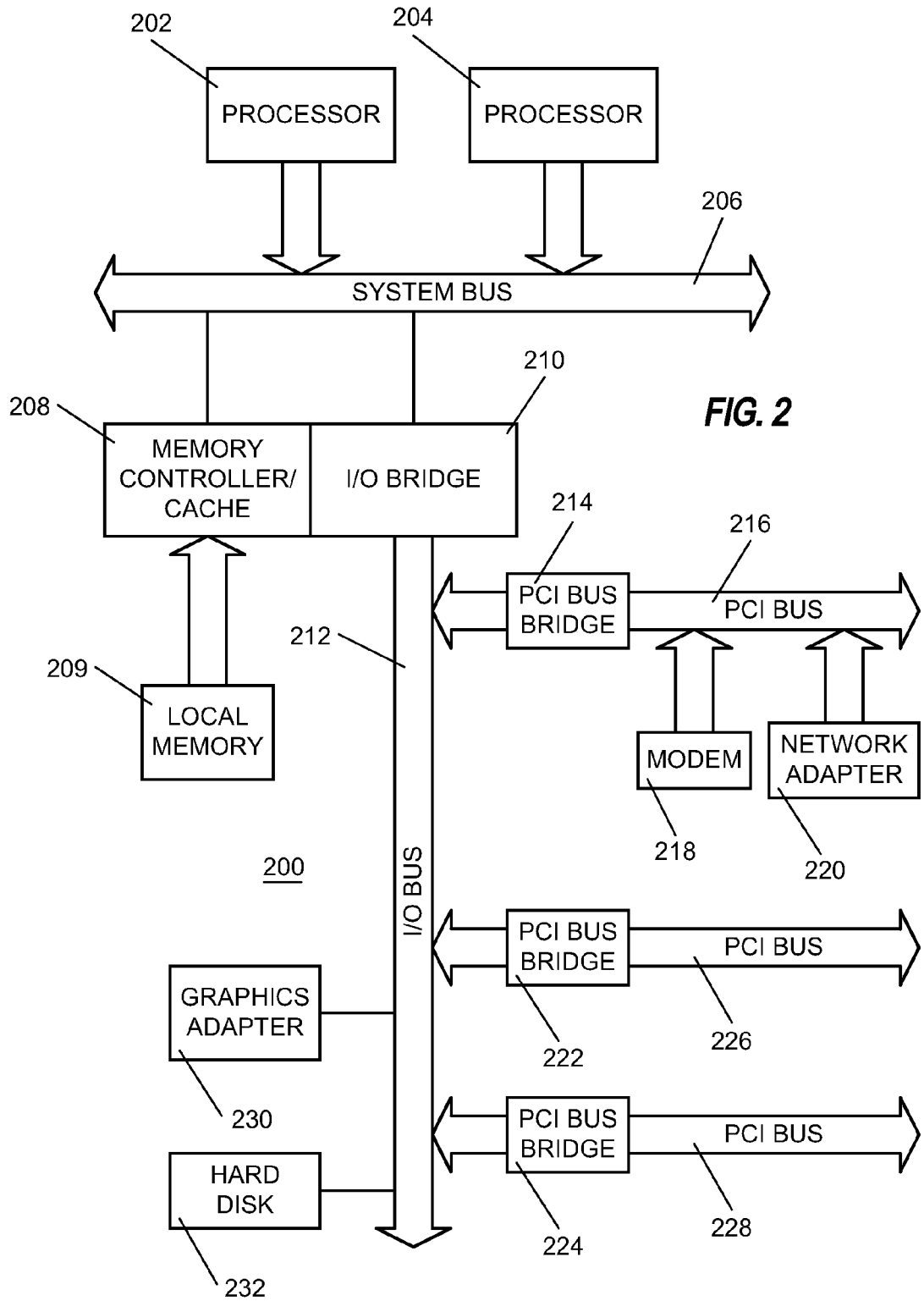
FIG. 2 is an exemplary block diagram of a server apparatus according to one or more embodiments of the invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
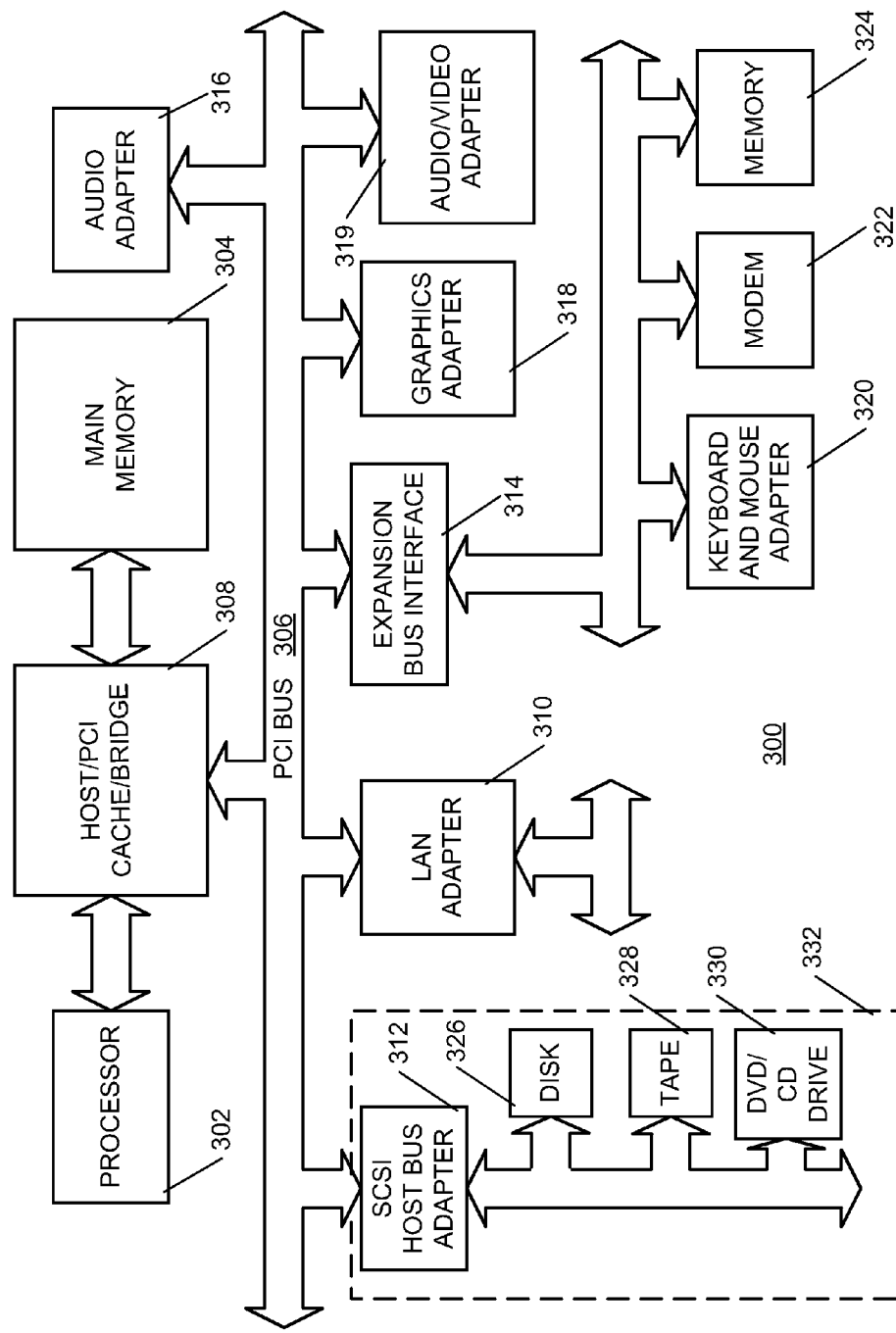
FIG. 3 is an exemplary block diagram of a client apparatus according to one or more embodiments of the invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

As will be appreciated by one skilled in the art, aspects of the present invention may be embodied as a system, method or program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The flowcharts and block diagrams in the figures illustrate architecture, functionality, and operation of possible implementations of systems, methods and program products according to various embodiments of the present invention. In this regard, each block in the flowcharts or block diagrams may represent a module, segment, or portion of code, which comprises one or more executable program instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Computer program code, i.e., instructions, for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like. The database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Furthermore, the described features, structures, or characteristics of the invention may be combined in any suitable manner in one or more embodiments. Correspondingly, even if features are initially claimed as acting in certain combinations, one or more features from a claimed combination can in some cases be excised from the combination, and the claimed combination can be directed to a subcombination or variation of a subcombination.

In the descriptions herein, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Benefits, advantages and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

Those skilled in the art having read this disclosure will recognize that changes and modifications may be made to the embodiments without departing from the scope of the present invention. It should be appreciated that the particular implementations shown and described herein are illustrative of the invention and its best mode and are not intended to otherwise limit the scope of the present invention in any way. Other variations are within the scope of the following claims.

While this specification contains many specifics, these should not be construed as limitations on the scope of the invention or of what can be claimed, but rather as descriptions of features specific to particular implementations of the invention. Headings herein are not intended to limit the invention, embodiments of the invention or other matter disclosed under the headings.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be appreciated from the foregoing that quality of service requirements can be addressed at a VLAN level on the switches according to one or more embodiments of the present invention. That is, with Converged Enhanced Ethernet (CEE) capable switches, the RDMA traffic may be tagged with a specific VLAN to run in lossless mode and the VLAN may be assigned an appropriate amount of bandwidth. Even without CEE, enabling global pause (i.e. flow control) on the ports will force both TCP and RDMA to run in lossless mode when there is congestion. However, embodiments presented herein enable segregation of the traffic to their corresponding VLAN devices. Consequently, access control lists and VMAP's may be used to meet quality of service requirements for each of the traffic types.

In summary, high availability for TCP traffic may be achieved in embodiments of the present invention with only a single multi-port adapter, because ether-channel bonding for TCP is enabled without impacting RDMAs inability to make use of this feature. TCP traffic can make use of both ports, such that if one goes down, the other can take over or continue working on its behalf. In spite of disparate protocols and limited availability of I/O expansion slots, a robust and complete network is achieved.

What is claimed is:

1. A computer program product for providing network communication on a computer system via first and second network communication protocols, the computer program product comprising:

a nontransitory computer readable storage media; and program instructions stored on the computer readable storage media programming the computer system to perform a method comprising:

performing first communication to and from a network via a first network communications protocol, including performing the first communication via a first virtual local area network ("VLAN") device on a first physical port of a computer system network adapter, wherein the network adapter also includes a second VLAN device on the first port and includes first and second VLAN devices on a second physical port, wherein the second VLAN devices are programmed as a logically bonded, virtual device for network communication via a second network communications protocol; and performing second communication to and from the network via the second network communications protocol, including performing the second communication on the second physical port via the logically bonded, virtual device and the second VLAN device of the second physical port, wherein the second communication is concurrent with the first communication.

2. The computer program product of claim 1, wherein the first network communication protocol includes a remote direct memory access ("RDMA") protocol and the second network communication protocol includes a transmission control protocol ("TCP") protocol.

3. The computer program product of claim 1, wherein performing the first communication comprises:

performing RDMA protocol communication on both of the first and second physical ports concurrently by the first VLAN devices, and wherein performing the second communication comprises:

performing TCP protocol communication on the second physical port by the logically bonded, virtual device and the second physical port's one of the second VLAN devices.

4. The computer program product of claim 1, the program instructions stored on the computer readable storage media further programming the computer system to:

provide an active-active communication mode for the bonded, virtual device, wherein performing the second communication further comprises:

performing the second communication via on both the first and second physical ports via the logically bonded, virtual device, wherein both the second VLAN devices communicate concurrently.

5. The computer program product of claim 1, the program instructions stored on the computer readable storage media further programming the computer system to:

provide an active-backup communication mode for the bonded, virtual device, wherein performing the second communication further comprises:

performing the second communication on one of the first and second physical ports via the logically bonded, virtual device, wherein only one of the second VLAN devices communicates at a time and when the communicating one of the second VLAN devices or its associated physical port fails, the other one of the second VLAN devices takes over the communication.

6. A computer system comprising:

a network adapter having a first and second virtual local area network ("VLAN") device configured on each of first and second physical ports of the network adapter, and having the second VLAN devices configured as a logically bonded, virtual device, wherein the first VLAN devices are configured with respective first and second network addresses and the bonded, virtual device is configured with a third network address.

7. The computer system of claim 6, comprising:

a first application stored on a computer readable storage media and programmed to perform network communication via a first network communication protocol over the first VLAN devices; and an application stored on a computer readable storage media and programmed to perform network communication via a second network communication protocol over the second VLAN devices and the logically bonded, virtual device, wherein at least one of the first VLAN devices provides network communication via the first network communication protocol and the logically bonded, virtual device concurrently provides network communication via the second network communication protocol.

8. The computer system of claim 7, wherein the first network communication protocol includes a remote direct memory access ("RDMA") protocol and the second network communication protocol includes a transmission control protocol ("TCP") protocol.

9. The computer system of claim 7, wherein performing the network communication by at least one of the first VLAN devices via the first network communication protocol and by the logically bonded, virtual device via the second network communication protocol comprise:

performing RDMA protocol communication on both of the first and second physical ports concurrently by the first VLAN devices; and performing TCP protocol communication on the second physical port by the logically bonded, virtual device and the second physical port's one of the second VLAN devices.

10. The computer system of claim 7 comprising:

a first instruction module having instructions stored on a computer readable media for performing the first network communication protocol; and a second instruction module having instructions stored on a computer readable media for performing the second network communication protocol, wherein the first or second application is programmed to perform communication via the second instruction module for the second network communication protocol and the second instruction module is programmed to provide an active-active mode for the bonded, virtual device, wherein performing the network communication via the second network communication protocol by the logically bonded, virtual device further comprises:

performing the network communication via the second network communication protocol on both the first and second physical ports by the logically bonded, virtual device, wherein both the second VLAN devices communicate concurrently.

11. The computer system of claim 7 comprising:

a first instruction module having instructions stored on a computer readable media for performing the first network communication protocol; and a second instruction module having instructions stored on a computer readable media for performing the second network communication protocol, wherein the first or second application is programmed to perform communication via the second instruction module for the second network communication protocol and the second instruction module is programmed to provide an active-backup mode for the bonded, virtual device, wherein performing the network communication via the second network communication protocol by the logically bonded, virtual device further comprises:

performing the network communication via the second network communication protocol on one of the first and second physical ports by the logically bonded, virtual device, wherein only one of the second VLAN devices communicates at a time and when the communicating one of the second VLAN devices or its associated physical port fails, the other one of the second VLAN devices takes over the communication.

* * * * *